Feb. 18, 1941. J. A. BOLT ET AL 2,232,048
COPPER CHLORIDE SWEETENING
Filed Sept. 29, 1938
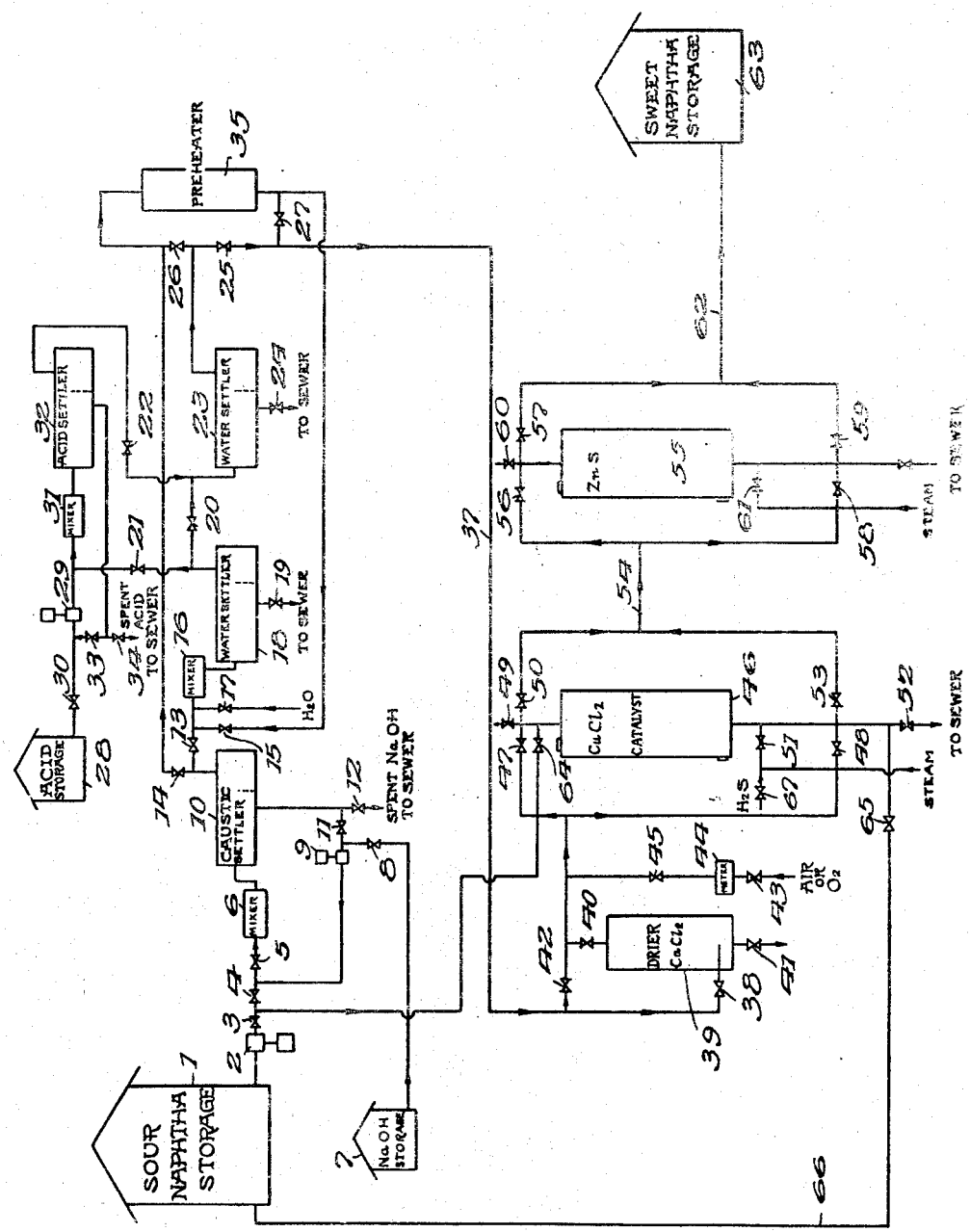
Inventors
John A. Bolt
Bernard H. Shoemaker
Geo. L. Parkhurst
Attorney Patented Feb. 18, 1941

2,232,048

UNITED STATES PATENT OFFICE 2,232,048

COPPER CHLORIDE SWEETENING

John A. Bolt, Chicago, Ill., and Bernard H. Shoemaker, Hammond, Ind., assignors to Standard Oil Company, Chicago, Ill., a corporation of Indiana Application September 29, 1938, Serial No. 232,452

10 Claims. (Cl. 196—30)

This invention relates to the sweetening of petroleum distillates such as gasoline, naphthas, kerosene, oleum spirits, etc. by the use of copper salts and particularly by the use of copper chloride.

Processes of this general type are well known. Such processes utilize as a sweetening reagent either a body of a solution of the copper salt or a so-called dry reagent which comprises copper salt on a carrier such as clay or pumice. Our invention particularly relates to processes utilizing the so-called dry type of reagent.

It is an object of our invention to provide improvements in copper chloride sweetening processes. More particularly it is an object of our invention to provide new and improved methods of moisture control in this type of process. Other and more detailed objects, advantages and uses of our invention will become apparent as the description thereof proceeds.

Copper chloride reagents of the so-called dry type can be prepared in various ways. In the past they have usually been prepared by subjecting the carrier which can suitably be a clay, for instance Attapulgus clay or other absorbent material preferably of a granular nature, to a dilute solution of a copper salt which may be, for instance, copper chloride or copper sulfate plus sodium chloride or ammonium chloride which yields a copper chloride type of reagent. The catalyst is then removed from the solution and dried at an elevated temperature to remove excess moisture while leaving in the catalyst an amount of water equal to from about 20% to about 25% of the total weight of the reagent including the adsorbent carrier. The amount of copper present as copper chloride can, for instance, be from about 5% to about 10%.

Non-adsorbent carriers such as pumice can likewise be used to support copper chloride and in this event less water, for instance a total of 5%, is used and the copper salt is applied to the carrier in solid form.

Since the carrier material, particularly in the case of argillaceous carriers, is likely to be alkaline, it is decidedly advantageous to incorporate a small amount of acid, preferably hydrochloric acid, in the copper salt solution applied to the carrier or to pretreat the clay with acid, preferably hydrochloric acid.

For example, we have found that when 130 grams of $CuCl_2.2H_2O$ is dissolved in 450 grams of water and the solution is mixed with 1053 grams of No. 1 Attapulgus clay part of the copper is rendered insoluble in water by the clay and incapable of acting as a sweetening reagent. As determined by Soxhlet extraction of the impregnated clay with water, we find that only 37% of the copper remains in water soluble form. However, when 60 c. c. of concentrated (37 to 38.5%) hydrochloric acid is added to the solution of water and copper salt used in the same amount as above and then mixed with the stated amount of clay, 94% of the copper remains in water soluble form and is capable of taking part in the sweetening reaction. The amount of acid to be added depends, of course, on the clay used.

The so-called dry copper chloride catalyst prepared by the above method or otherwise is used to sweeten petroleum distillates of the type above mentioned by passing such distillates over the catalyst or otherwise contacting them with the catalyst in the liquid phase at atmospheric or slightly elevated temperatures.

The details of the process as we prefer to carry it out can best be described by reference to the accompanying drawing which is a flow diagram of one embodiment of our invention.

A sour naphtha or other light petroleum distillate to be sweetened is pumped from storage tank 1 by means of pump 2, passes through valves 3, 4 and 5 and is contacted in mixer 6 with a dilute caustic solution, for instance sodium hydroxide solution, which is removed from storage tank 7 through valve 8 by pump 9 and introduced into the sour naphtha stream prior to passing through mixer 6. The mixed materials then proceed to caustic settler 10 where, the caustic settles out and is recycled through valve 11 by pump 9 if desired. From time to time or continuously the spent caustic is removed through valved line 12 to the sewer.

We have found that caustic settler 10 does not necessarily serve to remove the last traces of entrained caustic from the distillate and that any traces of caustic carried over into contact with the copper chloride reagent serve to destroy that reagent. It is therefore very important that the last traces of entrained caustic be removed and this can be done very effectively by water washing, preferably by two successive water washes.

These water washes serve not only to remove the last traces of the entrained caustic but likewise insure that the distillate will be saturated with water so that the moisture content of the catalyst will not be unduly reduced by the passage of the distillate therethrough and so that the moisture content can be controlled as will hereinafter appear.

The distillate from caustic settler 10 can be passed through valve 13 (valves 14 and 15 being closed) and thence through mixer 16. In advance of mixer 16 a small amount of wash water is introduced through valved line 17 and this water is settled out in water settler 18 and removed to the sewer periodically or continuously through valved line 19.

In ordinary cases the distillate being sweetened do not contain any substantial amount of nitrogen bases and when this is the case the distillate from water settler 18 passes through valve 20 (valves 21 and 22 being closed) into a second water settler 23 in which the last traces of water are removed through valved line 24 and the washed distillate passes through valve 25 (valves 26 and 27 being closed) into the system shown in the lower half of the flow diagram.

However, where the distillate being sweetened comes from a crude containing substantial quantities of nitrogen bases we find that these must be removed prior to the sweetening reaction. In this event valve 20 is closed and valves 21 and 22 are opened, dilute acid from tank 28 which may, for instance, be sulfuric or preferably hydrochloric acid of from about 1% to about 10% strength, too weak to remove any of the olefinic constituents of the distillate, is injected by means of pump 29 through valve 30 into the distillate line passing from water settler 18 to mixer 31. The acid and distillate, after mixing, pass to acid settler 32 from which the acid settles out and passes back to pump 29 through valve 33 or passes intermittently or continuously through valved line 34 to the sewer. The distillate from which acid has been settled passes through valve 22 to water settler 23 where any residual acid or water serves to settle out. A trace of acid carried over into the catalyst system is, however, not disadvantageous as is the carrying over of a trace of caustic and this is particularly true in the case of hydrochloric acid.

If the distillate being sweetened is cold, for instance below 60° F., it is desirable to preheat it prior to the sweetening step. Particularly when the catalyst used is supported on an hygroscopic support such as clay, it is desirable to keep the moisture content of the distillate rather low in order to avoid the necessity of too much drying prior to the catalytic sweetening operation and for this reason we prefer that the preheating be carried out after the caustic and water washing steps since in this way the solubility of water in the distillate is kept at a minimum during these steps.

Thus, when preheating is desired valve 25 is closed and valves 26 and 27 are opened (valves 14 and 15 being, of course, closed) and the distillate then passes through preheater 35 and thence out through valve 27 and line 37 to the apparatus shown in the lower half of the flow diagram.

However, if preheating is desired and a catalyst is used which requires a high moisture content in the stock, which is the case, for instance, when a non-hygroscopic support such as pumice is used, it is sometimes desirable to carry out the preheating step to bring the stock up to about normal room temperatures prior to the water washing in order to increase the amount of dissolved water. This can be accomplished by opening valves 14 and 15 and closing valves 13, 26 and 27. The course of the distillate from caustic settler 10 is then first through preheater 35 via valve 14, thence through water settlers 18 and 23 via valve 15 and thence to line 37 via valve 25.

In any event the washed distillate passes through line 37 to the equipment shown in the lower half of the flow diagram and almost invariably it is found that this distillate has too high a water content for optimum sweetening results. In fact we find it definitely advantageous that this water content be higher than the optimum since the process can be controlled far better by removing water than by endeavoring to control the water content precisely by control of the wash temperature, or by the addition of small amounts of water in the form of steam or otherwise.

The desired water content can be determined by virtue of the fact that when the water content drops too low the catalyst fails to sweeten while when the water content becomes too high a trace of copper compounds is taken over into the distillate and can be detected by chemical tests.

Thus the distillate, containing some dissolved water, passing through line 37 can be sent through valve 38, drier 39 and valve 40 before being subjected to the catalyst. This drying tower can contain any desired drying agent but we prefer to use calcium chloride. Occasionally calcium chloride solution is removed through valve line 41 and at long intervals it is necessary to replenish the supply of calcium chloride.

However, it is definitely disadvantageous to dry all of the material passing to the catalyst since, as previously described, this results in the catalyst becoming so dry that it fails to sweeten. Therefore we provide valved bypass line 42 and on either a continuous or intermittent basis we pass part of the washed distillate containing dissolved water through drying tower 39 and part of it through valved line 42. By this system of saturating the distillate with water and then drying a controlled portion of the distillate, we find that the optimum moisture content can readily be maintained and that the operation can be controlled to give very long catalyst runs. The system is much simpler and much more accurately controllable than a system in which the catalyst is intermittently blown with steam to increase its moisture content or with warm air to decrease its moisture content. Moreover, the necessity of interrupting operations to adjust the catalyst moisture content is avoided and corrosion and explosion hazards incident to the use of steam and air, respectively, are avoided.

Air or oxygen is introduced into the system through valve 43, meter 44 and valve 45 in controlled amount as is known to the art and the distillate containing some dissolved moisture as well as dissolved oxygen passes either into the top of catalyst tower 46 through valve 47 or into the bottom of this tower through valve 48. Catalyst tower 46 contains, of course, the "dry" copper chloride type of reagent prepared by any of the methods above mentioned. Either downflow through the catalyst bed or upflow therethrough can be used although we prefer to use downflow. When operating in this manner valves 48 to 52 are closed and the distillate passes through valve 47 downward through catalyst tower 46 and out through valve 53 and line 54. On the other hand, if upflow is preferred valves 47, 49, 51, 52 and 53 are closed and the catalyst flows through valves 48 and 50 and ultimately to line 54.

In either event the distillate can if desired be treated with a sulfide, for instance an alkali sulfide solution or a material such as zinc sulfide adsorbed on a carrier to remove any traces of copper compounds which may be picked up by the distillate and which may serve to promote the formation of gum therein. As shown, a tower 55 which may contain zinc sulfide adsorbed on clay is utilized and the sweetened distillate can be passed through this tower either upflow or downflow by control valves 56 to 59 (valves 60 and 61 being closed during the operation). From zinc sulfide tower 55 the product passes through line 62 to storage tank 63.

While the so-called dry copper chloride catalyst can be used to give very long runs it eventually becomes spent and must be removed and replaced. This represents a difficult problem since when a run is completed the catalyst contains very large quantities of adsorbed petroleum distillate of a highly flammable nature.

This problem can be solved by first destroying the spent copper chloride catalyst, which is useless in any event, and then steaming out the hydrocarbon materials. Thereafter the catalyst can safely be dumped and disposed of.

To destroy the catalyst one can, for instance, close valve 4 and pass a portion of the sour naphtha through pump 2 and valves 3 and 64 into catalyst chamber 46 (valves 47 to 53 being closed), thence out through valve 65 and back to sour naphtha storage tank 1 through line 66. Since this sour naphtha contains hydrogen sulfide the passage of it through the catalyst bed without caustic washing converts any residual copper chloride to copper sulfide. Thereafter steam can be introduced through valved line 51 and vented through valved line 49 (valves 47, 48, 50, 52, 53 and 65 being closed) and the catalyst is then ready to be dumped.

Alternatively some other source of hydrogen sulfide can be used and this can be injected through valved line 67 and vented through valved line 49. For instance, cracking still gases rich in hydrogen sulfide are suitable.

A still further method of destroying the spent catalyst prior to steaming is to pass caustic from tank 7 through valve 8 (valves 3, 5 and 11 being closed), pump 9 and valves 4 and 64 into catalyst chamber 46 and thence through valve 52 (valves 47 to 51, 53 and 65 being closed) to the sewer. Instead of using fresh caustic from tank 7, spent caustic can be used equally well since either sodium hydroxide or sodium sulfide will convert the copper to an insoluble compound which can be steamed without serious corrosion problems. Thus spent caustic can be cycled through valve 11, pump 9 and valves 4 and 64 to the catalyst chamber, valves 3, 5, 8 and 12 being closed.

Similarly the remaining copper chloride can be converted to copper carbonate by the use of sodium carbonate and still other reagents can be used to convert the copper into compounds which can be steamed without corrosion.

In any of these ways the copper chloride is first destroyed, the flammable hydrocarbons are removed by steam and the catalyst is put in disposable condition.

When the zinc sulfide catalyst in tower 55 needs to be disposed of it can be steamed directly by introducing steam from valved line 61 and venting it through valved line 60, the other valves associated with this tower being closed.

The spent caustic from valved line 12 can be used to neutralize the acid from valved line 34 and recover nitrogen bases therefrom.

While we have described our invention in connection with certain specific embodiments thereof, it is to be understood that these are by way of illustration and not by way of limitation and we do not intend to be limited thereby but only to the scope of the appended claims which should be construed as broadly as the prior art will permit.

We claim:

1. A method of copper chloride sweetening comprising saturating a sour petroleum distillate with water, drying a portion of said saturated distillate and passing both the dried and undried portions of said distillate into contact with a copper chloride sweetening reagent disposed on a solid carrier.

2. A method according to claim 1 in which said dried and said undried portions of said distillate are passed into contact with said reagents simultaneously.

3. A method according to claim 1 in which said dried and said undried portions of said distillate are passed into contact with said reagents successively.

4. A method of copper chloride sweetening comprising washing a sour petroleum distillate containing hydrogen sulfide with caustic thereby at one and the same time removing said hydrogen sulfide and saturating said distillate with water, then drying a portion of said distillate and passing both the dried and undried portions of said distillate through a bed of copper chloride sweetening reagent disposed on a solid carrier.

5. A method according to claim 4 in which said dried and said undried portions of said distillate are passed over said reagent simultaneously.

6. A method according to claim 4 in which said dried and said undried portions of said distillate are passed over said reagent successively.

7. A method of copper chloride sweetening comprising washing a petroleum distillate containing hydrogen sulfide with caustic to remove said hydrogen sulfide, washing said distillate to remove entrained caustic therefrom, drying a portion of said distillate and passing both the dried and undried portions of said washed distillate through a bed of copper chloride sweetening reagent disposed on a solid carrier.

8. In the method of sweetening a sour petroleum distillate by passing the sour distillate through a bed of copper chloride disposed on a solid carrier, the improvement in maintaining the proper moisture content within the bed of copper chloride sweetening reagent comprising saturating the sour petroleum distillate with water, drying a portion of said water saturated sour distillate and subsequently passing both the dried and undried portions of the sour petroleum distillate through the bed of copper chloride sweetening reagent whereby a uniform moisture content is maintained within the bed of said copper chloride sweetening reagent.

9. The improvement in the method of sweetening a sour petroleum distillate according to claim 8 in which the dried and undried portions of the sour distillate are passed over said reagent simultaneously.

10. The improvement in the method of sweetening a sour petroleum distillate according to claim 8 in which the dried and undried portions of the sour distillate are passed over said reagent successively.

JOHN A. BOLT.
BERNARD H. SHOEMAKER.